(12) United States Patent
Phillips

(10) Patent No.: US 7,967,311 B2
(45) Date of Patent: Jun. 28, 2011

(54) MULTI POSITION STEP

(76) Inventor: David E. Phillips, Ida, MI (US)

( * ) Notice: Subject to any disclaimer, the term of this patent is extended or adjusted under 35 U.S.C. 154(b) by 92 days.

(21) Appl. No.: 12/217,349

(22) Filed: Jul. 3, 2008

(65) Prior Publication Data

US 2009/0008896 A1 Jan. 8, 2009

Related U.S. Application Data

(60) Provisional application No. 60/958,577, filed on Jul. 6, 2007.

(51) Int. Cl.
*B60R 3/02* (2006.01)
(52) U.S. Cl. .................. 280/166; 280/163
(58) Field of Classification Search ............ 280/163, 280/164.1, 166
See application file for complete search history.

(56) References Cited

U.S. PATENT DOCUMENTS

| | | | |
|---|---|---|---|
| 5,897,125 A | 4/1999 | Bundy | |
| 6,170,843 B1 * | 1/2001 | Maxwell et al. | 280/166 |
| 6,237,927 B1 * | 5/2001 | Debo | 280/166 |
| 6,474,668 B2 * | 11/2002 | Debo | 280/166 |
| 6,530,588 B1 * | 3/2003 | Varney et al. | 280/166 |
| 6,682,086 B1 * | 1/2004 | Erickson | 280/166 |
| 6,685,204 B1 * | 2/2004 | Hehr | 280/166 |
| 6,769,704 B2 * | 8/2004 | Cipolla | 280/163 |
| 6,994,362 B2 * | 2/2006 | Foster | 280/163 |
| 7,114,736 B2 * | 10/2006 | Stodola et al. | 280/164.1 |
| 7,168,722 B1 * | 1/2007 | Piotrowski et al. | 280/166 |
| 7,195,262 B2 * | 3/2007 | Chaudoin et al. | 280/166 |
| 7,503,572 B2 * | 3/2009 | Park et al. | 280/163 |
| 7,661,693 B1 * | 2/2010 | Lipski | 280/491.5 |
| 2001/0045720 A1 * | 11/2001 | Schlicht | 280/166 |
| 2003/0116938 A1 * | 6/2003 | Shields et al. | 280/166 |
| 2005/0212249 A1 * | 9/2005 | Lopez | 280/164.1 |
| 2006/0082095 A1 * | 4/2006 | Knittel | 280/163 |
| 2006/0091637 A1 * | 5/2006 | Knittel | 280/163 |
| 2006/0170179 A1 * | 8/2006 | Dahl | 280/163 |
| 2006/0170180 A1 * | 8/2006 | Collins | 280/166 |
| 2008/0067775 A1 * | 3/2008 | DiCarlo et al. | 280/166 |
| 2009/0008896 A1 * | 1/2009 | Phillips | 280/166 |
| 2009/0079157 A1 * | 3/2009 | Fratzke | 280/166 |
| 2009/0243249 A1 * | 10/2009 | Arvanites | 280/166 |

* cited by examiner

*Primary Examiner* — Jeffrey J Restifo
(74) *Attorney, Agent, or Firm* — Emch, Schaffer, Schaub & Porcello, Co., L.P.A.

(57) ABSTRACT

A dual position step assembly that can be mounted into a standard square towing receiver that is previously installed on a pickup truck or similar vehicle is described. The step assembly is mounted to the rear of the vehicle. The step can be pivoted to two positions, either vertical or horizontal. When placed in the vertical position the step assembly automatically seats into a downward self locking position. The weight of the step assembly provides the force necessary to set the step assembly into the self locking position.

8 Claims, 2 Drawing Sheets

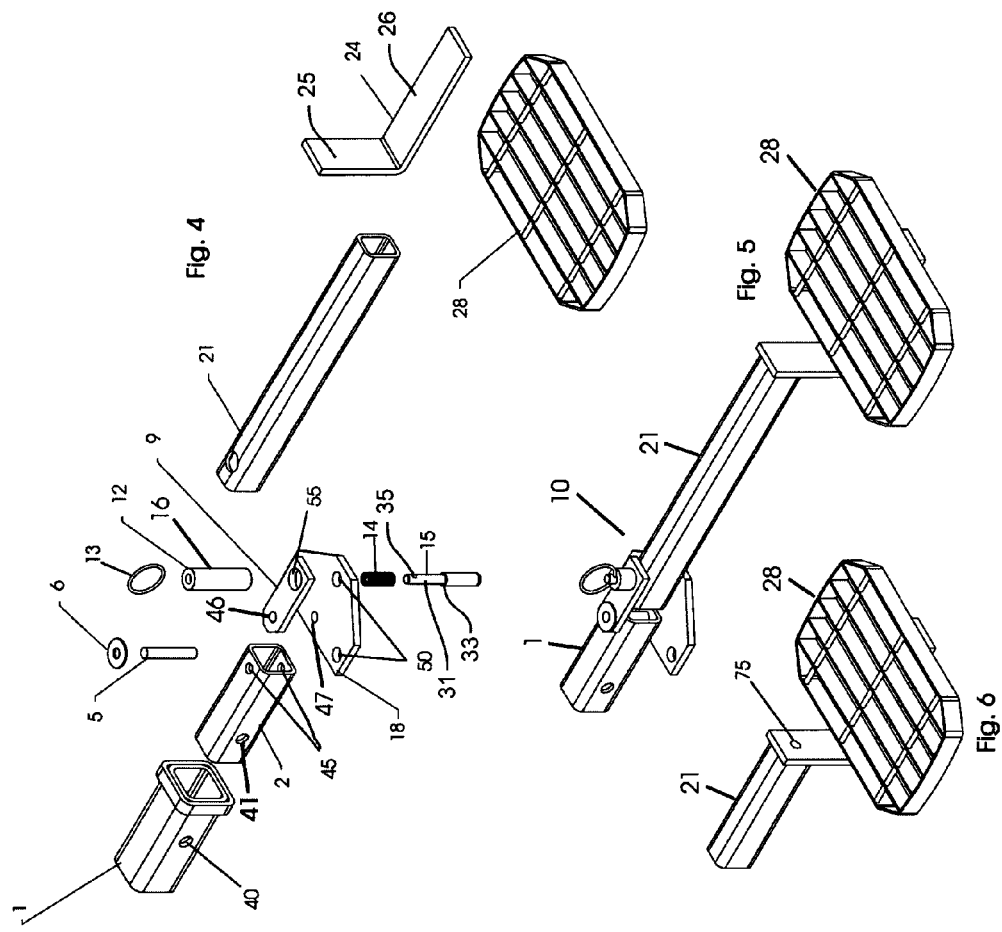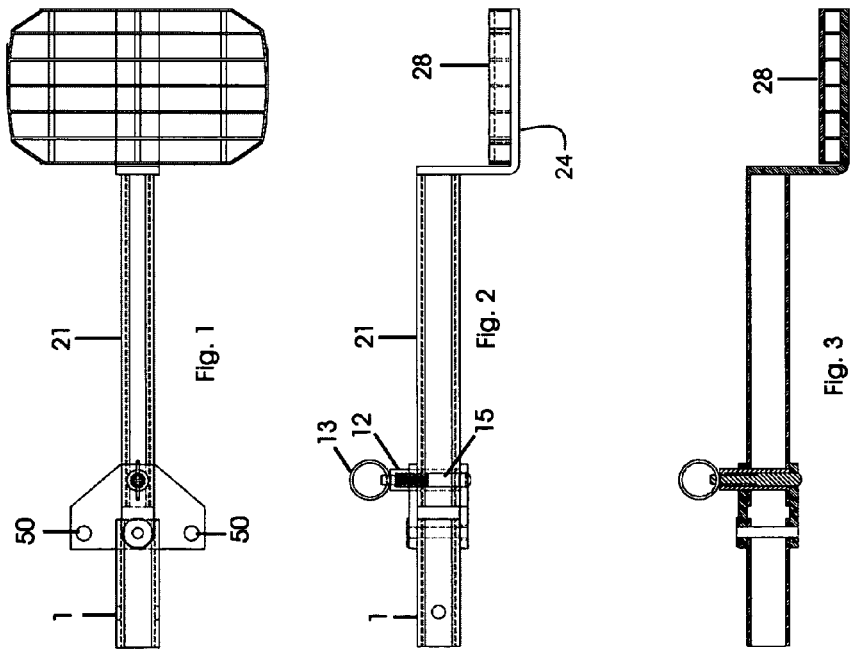

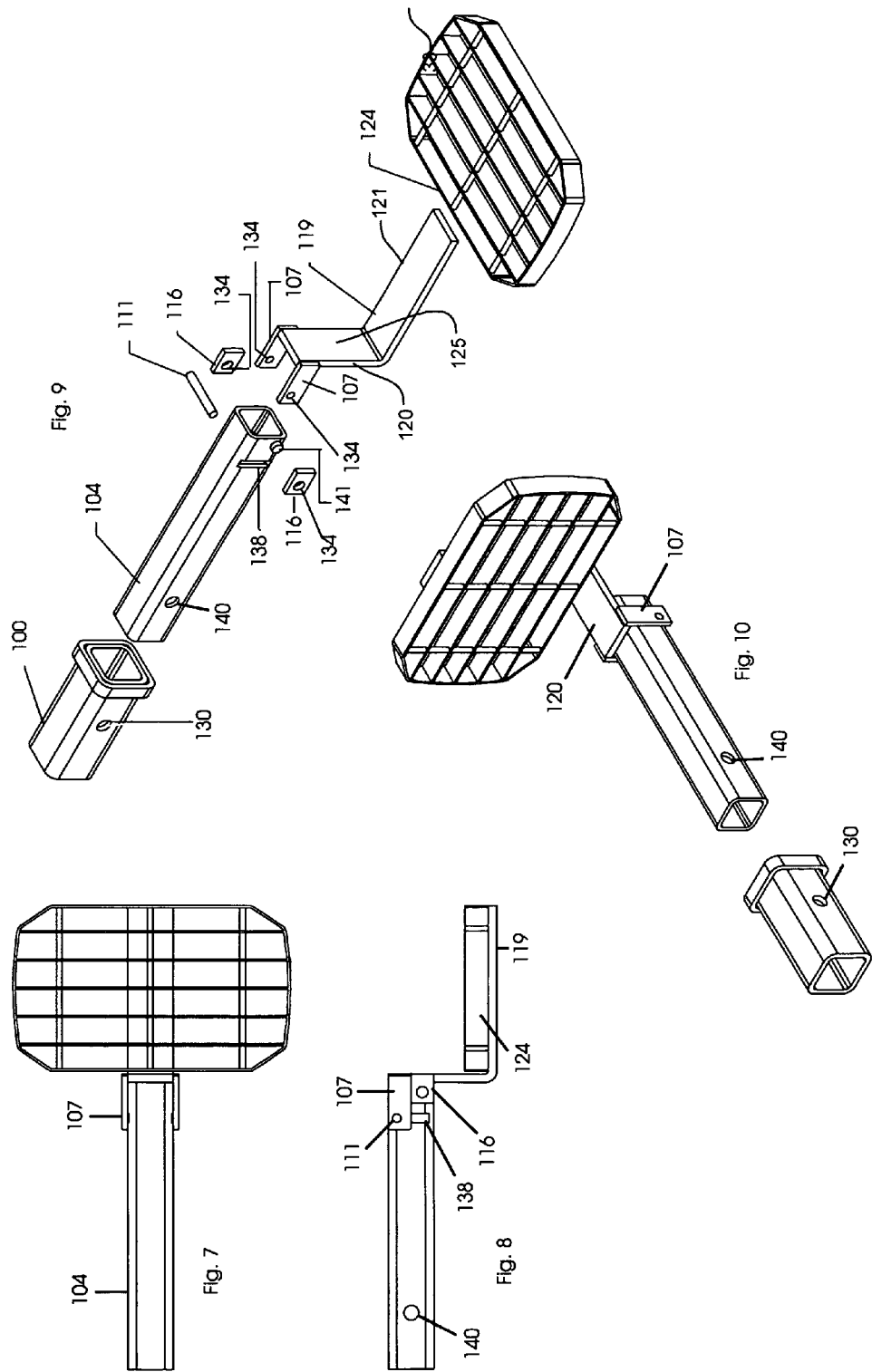

MULTI POSITION STEP

CROSS REFERENCE TO RELATED APPLICATIONS

This application claims the benefit of U.S. Provisional patent application Ser. No. 60/958,577 filed on Jul. 6, 2007.

BACKGROUND OF THE INVENTION

The present invention relates to a step that can be secured to a vehicle. The step is designed to be mounted in the receiver for a trailer hitch that is attached to the vehicle. The step can be pivoted or rotated to change the location for the step to enhance access to various locations on the vehicle. Primarily the step is utilized to provide access to the rear cargo area or the top of the vehicle to which the step is secured. The step is removably attached to the trailer hitch receiver so that the step can be conveniently removed from the vehicle when the step is not needed.

Various steps have been available in the past but these steps were primarily used to facilitate the entry and exit from the vehicle. The drawback with this type of a step is that it is permanently attached to the vehicle and only assists with the entry and exit into the passenger compartment of the vehicle. The step of the present invention is removable from the vehicle and also provides access to the rear cargo compartment or the top of the vehicle

SUMMARY OF THE INVENTION

The present invention is a multi position step assembly 10 mounted into a standard square hitch or towing receiver 1 that is previously installed on a car, pickup truck or other vehicle. The step assembly is mounted to the rear of the vehicle. The step can be pivoted to three preset horizontal positions and secured in those positions by means of a set pin that is spring tensioned to put a downward force on the set pin so as to engage the set pin into a predrilled hole in a positioning plate, thereby securing the step in position. To change step positions a pull ring is pulled to an up position which will raise and disengage the set pin from the predrilled hole in the positioning plate, thereby allowing the movement of the step to another position.

The present invention is also directed to a dual position step assembly mounted into a standard square towing receiver that is previously installed on a pickup truck or similar vehicle. The step assembly is mounted to the rear of the vehicle. The step can be pivoted to two positions, either vertical or horizontal. When placed in the vertical position the step assembly automatically seats into a downward self locking position. The weight of the step assembly provides the force necessary to set the step assembly into the self locking position.

To place the step assembly to a horizontal position from the vertical position the step assembly is grasped by hand and pulled upward vertically approximately one inch and pulled backward in a circular motion until the step assembly comes to rest in the horizontal position.

To place the step assembly to a vertical position from the horizontal position the step assembly is grasped by hand and pulled upward in a circular motion to a vertical position, at which point the weight of the step assembly will seat the step assembly into a self locking position.

Other objects and advantages of the present invention will become apparent to those skilled in the art upon a review of the following detailed description of the preferred embodiments and the accompanying drawings.

BRIEF DESCRIPTION OF THE DRAWINGS

FIG. 1 is a top view of the invention.
FIG. 2 is a side elevation view.
FIG. 3 is a side cross sectional view.
FIG. 4 is an explode perspective view.
FIG. 5 is a perspective view of the assembled invention.
FIG. 6 is a partial perspective view of the step portion of the invention.
FIG. 7 is a top view of an additional feature of the invention.
FIG. 8 is a side elevation view.
FIG. 9 is an exploded perspective view.
FIG. 10 is an exploded perspective view.

DETAILED DESCRIPTION OF THE PREFERRED EMBODIMENT(S)

The present invention is a multi position step assembly 10 mounted into a standard square hitch or towing receiver 1 that is previously installed on a car, pickup truck or other vehicle. The step assembly is mounted to the rear of the vehicle. The step can be pivoted to three preset horizontal positions and secured in those positions by means of a set pin that is spring tensioned to put a downward force on the set pin so as to engage the set pin into a predrilled hole in a positioning plate, thereby securing the step in position. To change step positions a pull ring is pulled to an up position which will raise and disengage the set pin from the predrilled hole in the positioning plate, thereby allowing the movement of the step to another position.

As shown in FIGS. 1-6, the step assembly 10 has a receiver inlet mounting apparatus 2, with two holes 40 positioned in opposed aligned relationship, near the back portion of the receiver inlet mounting apparatus 2. When the receiver inlet mounting apparatus 2 is inserted into the typical vehicle tow bar receiver 1, the hitch pin holes 40 align with two opposed and aligned holes 4, in the receiver 1. A hitch pin is inserted into holes 40 and 41, as is well known in the art to retain the inlet mounting apparatus 2.

Two opposed and aligned holes 45 are located in the receiver inlet apparatus 2, for which pivot pin 5, is to be inserted through. The holes 45 are at the opposite end of the apparatus 2 from the two holes 40, for the hitch pin and oriented ninety degrees in relation to the hitch pin holes 40. Pivot pin 5 is inserted through the two holes 45 in the receiver inlet apparatus 2. A portion of the pin 5 extends into an aperture 46 in the top support plate 9 and a portion extends through aperture 47 in the bottom positioning plate 18, Top support plate 9 is retained onto the protruding pivot pin 5, by a securing washer 6, on the top of pivot pin 5.

Positioning plate 18 is aligned to receiver inlet apparatus 2, by means of a positioning pivot pin hole 47, that accepts the pivot pin 5. The positioning plate 18, further defines at least three holes 50 that are disposed to be in alignment with the hole 55 located in the top support plate 9. Positioning plate 18 is secured to receiver inlet apparatus 2, by welding or other appropriate means. Positioning plate 18 has at least three positioning holes 50, which will accept set pin 15.

Latch pin assembly 12, which consist of cylinder 16, pull ring 13, spring 14, and set pin 15, is inserted through top latch pin assembly hole 55, in support plate 9, and through the latch pin assembly holes 55, in support apparatus 21. The latch pin assembly 12 is secured in place by securing the cylinder 16 by welding or other appropriate means to the top support plate 9. Set pin 15, protrudes into positioning holes 50 on the position plate 18. The cylinder 16 extends through the pin assembly hole 55 in the support plate 9 and through the upper hole in the support apparatus 21. The set pin 15 has a reduced diameter section 31 that defines a shoulder 33. A passageway 35 extends through the end of the reduced diameter section 31 that is spaced apart from the shoulder 33. The spring 14 is positioned on the reduced diameter section 31 of the set pin 15. The spring 14 engages the shoulder 33 and the bottom of the cylinder that extends into the support apparatus 21. The reduced diameter section extends through the cylinder 16 so that the passageway 35 is positioned above the top of the cylinder 16 to allow pull ring 13 to be inserted into the passageway. The spring 14 biases the set pin in a direction towards the positioning plate 18 to engage one of the positioning holes 50. It is necessary to pull on the pull ring 13 in a direction away from the positioning plate 18 with a force sufficient to overcome the biasing force of spring 14 to disengage the set pin 15 from the positioning holes 50 in the positioning plate 18.

Two opposite latch pin assembly holes 56, in the rear portion of support apparatus 21 are to line up vertically with the latch pin assembly hole 55, in the top of support plate 9. Support apparatus 21, is secured to under side of top support plate 9, by welding or other appropriate means. The shorter vertical portion 25 of support platform support 24 is secured to the end of support apparatus 21, opposite the end containing the two latch pin assembly holes 55, with the longer horizontal portion 26 of step platform support 24, positioned to the bottom and facing the opposite direction of the support apparatus 21.

Step platform 28, is mounted in a flat horizontal position on top of the longer horizontal portion 26 of step platform support 24. Step platform 28, is centered onto step platform support 24, with the wider width set ninety degrees in relation to the step platform support 24, longer horizontal portion. Step platform 28, is usually equal in length to the longer horizontal portion 26 of the step platform support 24, longer horizontal support arm length. Step platform 28, is secured in place by welding or other appropriate means.

Optional step platform pivot 75 will permit step platform 28, to pivot to a vertical position. Platform pivot 75 is a releasable securing device such as a bolt and nut that is used to retain the step platform 28 in a desired position with respect to the step platform support and the vehicle. The platform pivot allows the step platform support 24 and the step platform to pivot around an axis that is substantially parallel to the longitudinal axis of the support apparatus 21. It should be understood that other devices that can provide for rotational movement can be used to rotatable secure the step platform support 24 to the support apparatus 21.

The present invention is also directed to a dual position step assembly mounted into a standard square towing receiver that is previously installed on a pickup truck or similar vehicle. The step assembly is mounted to the rear of the vehicle. The step can be pivoted to two positions, either vertical or horizontal. When placed in the vertical position the step assembly automatically seats into a downward self locking position. The weight of the step assembly provides the force necessary to set the step assembly into the self locking position.

To place the step assembly to a horizontal position from the vertical position the step assembly is grasped by hand and pulled upward vertically approximately one inch and pulled backward in a circular motion until the step assembly comes to rest in the horizontal position.

To place the step assembly to a vertical position from the horizontal position the step assembly is grasped by hand and pulled upward in a circular motion to a vertical position, at which point the weight of the step assembly will seat the step assembly into a self locking position.

As shown in FIGS. 7-10, the step assembly has a receiver inlet mounting apparatus 104, with two opposed and aligned hitch pin holes 140, near the portion of the receiver inlet mounting apparatus 104, that when inserted into the typical vehicle tow bar receiver 100, align with two opposed and aligned hitch pin holes 130 in the typical vehicle tow bar receiver 100. A hitch pin is inserted through holes 130 and holes 140 to retain the inlet mounting apparatus 4 in the tow bar receiver 100.

The receiver inlet mounting apparatus 104 has two opposed and aligned pivot pin slots 138 located near the end of the receiver inlet mounting apparatus 104 that is spaced apart from the hitch pin holes 130. The pin slots 138 are on the same sides of the receiver inlet mounting apparatus 104 as the hitch pin holes 130 and parallel to hitch pin holes 130.

A stop plate 116 is positioned on each side of the receiver inlet mounting apparatus 104, by placing the pivot pin hole 134 in the stop plate 116, on alignment studs 141. The stop plate 116 is secured to the inlet mounting apparatus by welding or other appropriate means.

Pivot pin 111, is inserted through pivot pin hole 134, in one pivot plate 107, through pivot pin slot 138, and through pivot pin hole 134 in one pivot plate 107 on the opposite side of the inlet mounting apparatus 104. The ends of pivot pin 111 are secured to pivot plate 107 by welding or other appropriate means.

The two pivot plates 107 are secured to a step platform support 119 and positioned on the sides of step platform support 119 at the end of the first leg 120. The top of pivot plates 107 being flush with the end of the first leg 120 of step platform support 119 and the ends of pivot plate 107, that are the ends opposite the pivot pin hole end in pivot plate 107 being flush to the face 125 of the first leg of step platform support 119. The face being the flat surface of the first leg of step platform support 119, which is ninety degrees from the flat surface of second leg 121 of step platform support 119. Pivot plates 107, are secured to step platform support 119, by welding or other appropriate means.

Step platform 124, is mounted in a flat horizontal position on top of the flat longer horizontal portion of second leg 121 of step platform support 119. Step platform 124 is centered onto step platform support 119, with the wider width set ninety degrees in relation to the second leg 121 of the step platform support 119. Step platform 124 is usually equal in length to the horizontal portion of second leg 121 of the step platform support 119. Step platform 124, is secured in place by welding or other appropriate means. Step platform 124, can be constructed from bar grating, diamond plate, grip strut or other similar material.

When the step assembly is positioned with the step platform 124 in a horizontal orientation, as shown in FIGS. 7-9, the pivot pin 111 is located at the top of the pivot pin slots 138 in the inlet mounting apparatus 104 and the two pivot plates 107 are in contact with the top of stop plates 116. This orientation for the pivot pin 111 and the pivot plates 107 secure the step platform support 119 in a position where the step platform 124 is securely mounted in a horizontal orientation. The weight of the step platform support 119 and the step platform 124 hold the step platform in this orientation. When the step platform is in vertical orientation, as shown in FIG. 10, the pivot pin 111 is located at the bottom of the pivot pin slots 138 in the inlet mounting apparatus 104 and the two pivot plates 107 are in contact with the side of the stop plates 116. In addition, a portion of the first leg 120 of the step platform support 119 is positioned on the top of the inlet mounting apparatus 104. The weight of the step platform support and the step platform 124 hold the step platform in this orientation. To move the step platform 124 from the horizontal or vertical position requires the motion previously described.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A step assembly that can be positioned in a horizontal or vertical position for use with a towing receiver on a vehicle comprising:
    a receiver inlet mounting apparatus that is removably positioned in the towing receiver; the receiver inlet mounting apparatus extending from the towing receiver in a direction away from the vehicle;
    two opposed and aligned pivot pin slots located on the end of the receiver inlet mounting apparatus that extends from the towing receiver;
    a stop plate positioned on at least one side of the receiver inlet mounting apparatus, the at least one stop plate located adjacent the pivot pin slots;
    at least one pivot plate moveably secured to the receiver inlet mounting apparatus by a pivot pin that is position in the pivot pin slots in the receiver inlet mounting apparatus, the at least one pivot plate being secured to the pivot pin;
    a step platform support is secured to the at least one pivot plate; and
    a step platform is mounted to the step platform support whereby the step platform is positioned to provide enhanced access to locations on the vehicle; the stop plate engaging the at least one pivot plate to retain the step platform in the desired vertical or horizontal position; the weight of the step platform holds and locks the step platform in the desired horizontal or vertical orientation.

2. The assembly of claim 1 wherein a stop plate is positioned on opposed sides of the receiver inlet mounting apparatus.

3. The assembly of claim 1 wherein a pivot plate is positioned on opposed sides of the receiver inlet mounting apparatus.

4. The assembly of claim 1 wherein the stop plate engages the top of the at least one pivot plate to retain the step platform in a desired horizontal position.

5. The assembly of claim 4 wherein the pivot pin secured to the pivot plate engages the top of the pivot pin slots when the step platform is in a desired horizontal position.

6. The assembly of claim 1 wherein the pivot pin secured to the pivot plate engages the bottom of the pivot pin slots when the step platform is in a desired vertical position.

7. The assembly of claim 6 wherein the stop plate engages the side of the at least one pivot plate to retain the step platform in a desired vertical position.

8. A step assembly that can be positioned in a horizontal or vertical position for use with a towing receiver on a vehicle comprising:
    a receiver inlet mounting apparatus that is removably positioned in the towing receiver; the receiver inlet mounting apparatus extending from the towing receiver in a direction away from the vehicle;
    two opposed and aligned pivot pin slots located on the end of the receiver inlet mounting apparatus that extends from the towing receiver;
    a stop plate positioned on opposite sides of the receiver inlet mounting apparatus, the stop plates located adjacent the pivot pin slots;
    a pivot plate secured to opposite sides of the receiver inlet mounting apparatus by a pivot pin that is position in the pivot pin slots in the receiver inlet mounting apparatus, the pivot plates being secured to the pivot pin;
    a step platform support is secured to the at least one pivot plate; and
    a step platform is mounted to the step platform support whereby the step platform is positioned to provide enhanced access to locations on the vehicle; the stop plates engaging the sides of the pivot plates and the pivot pin engaging the bottom of the pivot pin slot when the step platform is in the desired vertical position; the stop plates engaging the top of the pivot plates and the pivot pin engaging the top of the pivot pin slot when the step platform is in the desired horizontal position, the weight of the step platform holding and locking the step platform in the desired vertical or horizontal orientation.

* * * * *